July 13, 1943. N. ERLAND AF KLEEN 2,323,901
CONTROL SYSTEM FOR REFRIGERATING APPARATUS
Filed Feb. 24, 1941 6 Sheets-Sheet 1

INVENTOR.
Nils Erland af Kleen
BY C. P. Goepel
his ATTORNEY

July 13, 1943.   N. ERLAND AF KLEEN   2,323,901
CONTROL SYSTEM FOR REFRIGERATING APPARATUS
Filed Feb. 24, 1941   6 Sheets-Sheet 3

INVENTOR.
Nils Erland af Kleen
C. P. Goepel
BY   his   ATTORNEY

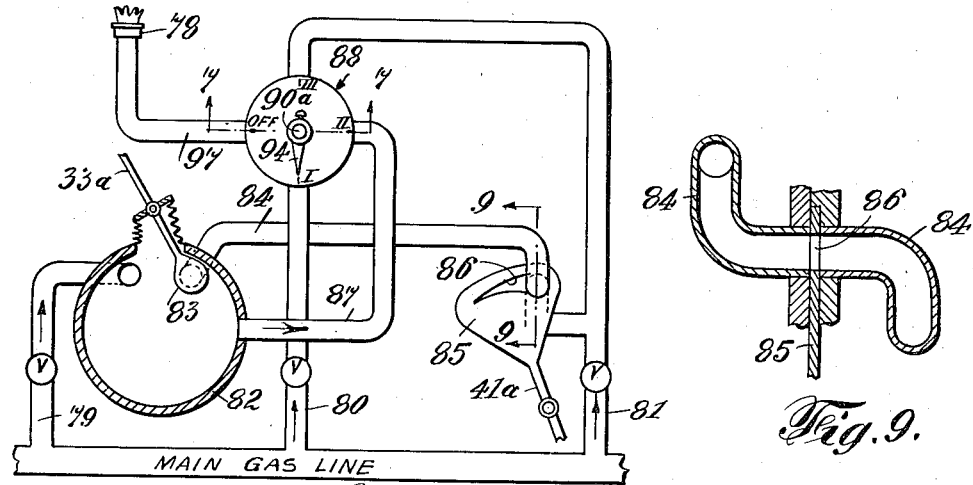
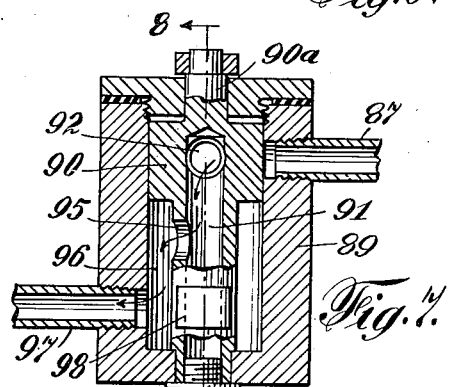
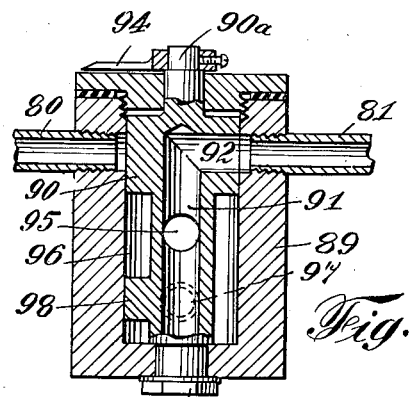
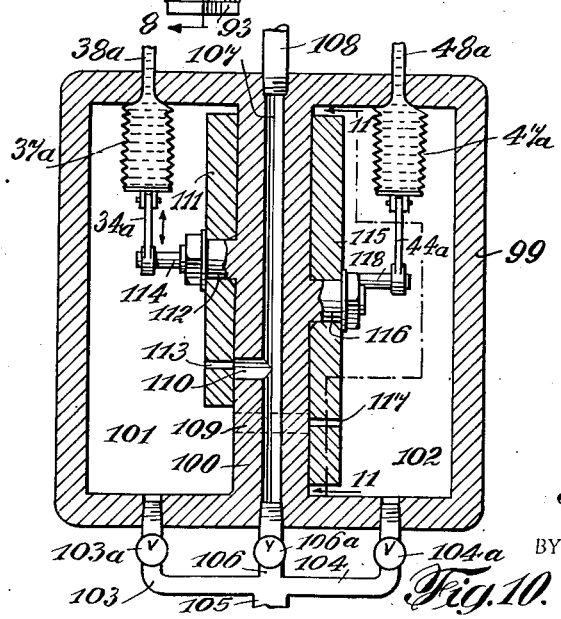

Patented July 13, 1943

2,323,901

UNITED STATES PATENT OFFICE 2,323,901

CONTROL SYSTEM FOR REFRIGERATING APPARATUS

Nils Erland af Kleen, Stockholm, Sweden

Application February 24, 1941, Serial No. 380,330

24 Claims. (Cl. 62—5)

This invention relates to new and useful improvements in systems utilizing energy to maintain predetermined conditions in a mass, body, room, space or the like, and is directed more particularly to a control system for regulating the quantity of energy according to the conditions inside and outside the said mass, body, room, space and the like.

Generally speaking where predetermined conditions are being controlled in a mass, body, space, room and the like, the greater the difference between the conditions inside and those outside said mass, the more energy has to be supplied thereto. In some systems, the quantity of energy supplied to the energy-producing unit will have to be correspondingly increased with an increasing difference between the conditions inside and those outside the mass being controlled. In certain other systems, on the other hand, the quantity of energy supplied to the energy-producing unit will have to be correspondingly decreased with an increasing difference between the aforementioned conditions.

As an example, where the question is one of refrigeration, among those systems falling in the first category can be mentioned, a continuous absorption system of the water-ammonia-inert gas type, an ordinary compressor system and the like, while among those systems coming under the second category can be found the intermittent dry absorption system and those systems operating in relatively the same manner. In the latter systems, the range of operation will be within decreasing limits of temperature with increasing outside temperature conditions. In other words, at a lower temperature outside the mass being controlled, the refrigeration-producing unit can be utilized to a lower end temperature than at a higher outside temperature conditions. Consequently, the amount of energy to be supplied to such a refrigeration-producing unit must be relatively less at a higher outside temperature in order to have the refrigerating system operate under its most favorable conditions.

Heretofore, in systems of the types above mentioned, it has not been possible to have such systems operate at their best efficiencies during varying conditions, that is, when the difference in temperature between that inside the mass and that outside the mass varied, and the greater the difference between such temperatures, the more difficult it became to maintain the efficiencies of the energy-producing units.

It is therefore the primary object of the present invention to overcome the deficiencies in systems heretofore known, and to this end the invention consists in a system of control by which it is possible to operate the energy-producing units at their best efficiencies independent of the varying conditions not only inside the mass, but also of the varying difference between the conditions inside and outside the same mass.

The invention consists also in a control system of this character responsive to the conditions in the mass being controlled as well as to the conditions outside the said mass, for regulating the amount of energy supplied to the energy-producing units.

Furthermore, the invention consists in a simple arrangement wherein all of the control members for the regulation of the kind and quantity of energy to be supplied, are centralized to form a compact unit with the separate impulse lines leading therefrom to the different points, such as inside the mass, outside the mass, and so forth, to be influenced by the different conditions.

The invention consists further in a unitary control system responsive to a plurality of separate impulses generated by conditions in different parts of a mass and the like, and to separate impulses generated by conditions outside said mass.

The new and novel features of the invention will be hereinafter set forth more in detail in the following description, illustrated by way of examples in the accompanying drawings, and more particularly pointed out in the appended claims.

Referring to the drawings, in which numerals of like character designate similar parts throughout the several views—

Fig. 6 is a diagrammatic view of a control system for regulating the amount of gas or other fluid medium supplied to a burner for use in heating the boiler absorber of an absorption refrigerating unit;

Fig. 7 is a sectional view taken on line 7—7 of Fig. 6;

Fig. 8 is a sectional view taken on line 8—8 of Fig. 7;

Fig. 9 is a sectional view taken on line 9—9 of Fig. 6;

Fig. 10 is a vertical section through a modified form of thermostat valve arrangement for selectively regulating the amount of gas or other fluid medium supplied to the burner;

Fig. 11 is a view taken along line 11—11 of Fig. 10;

Figure 1:
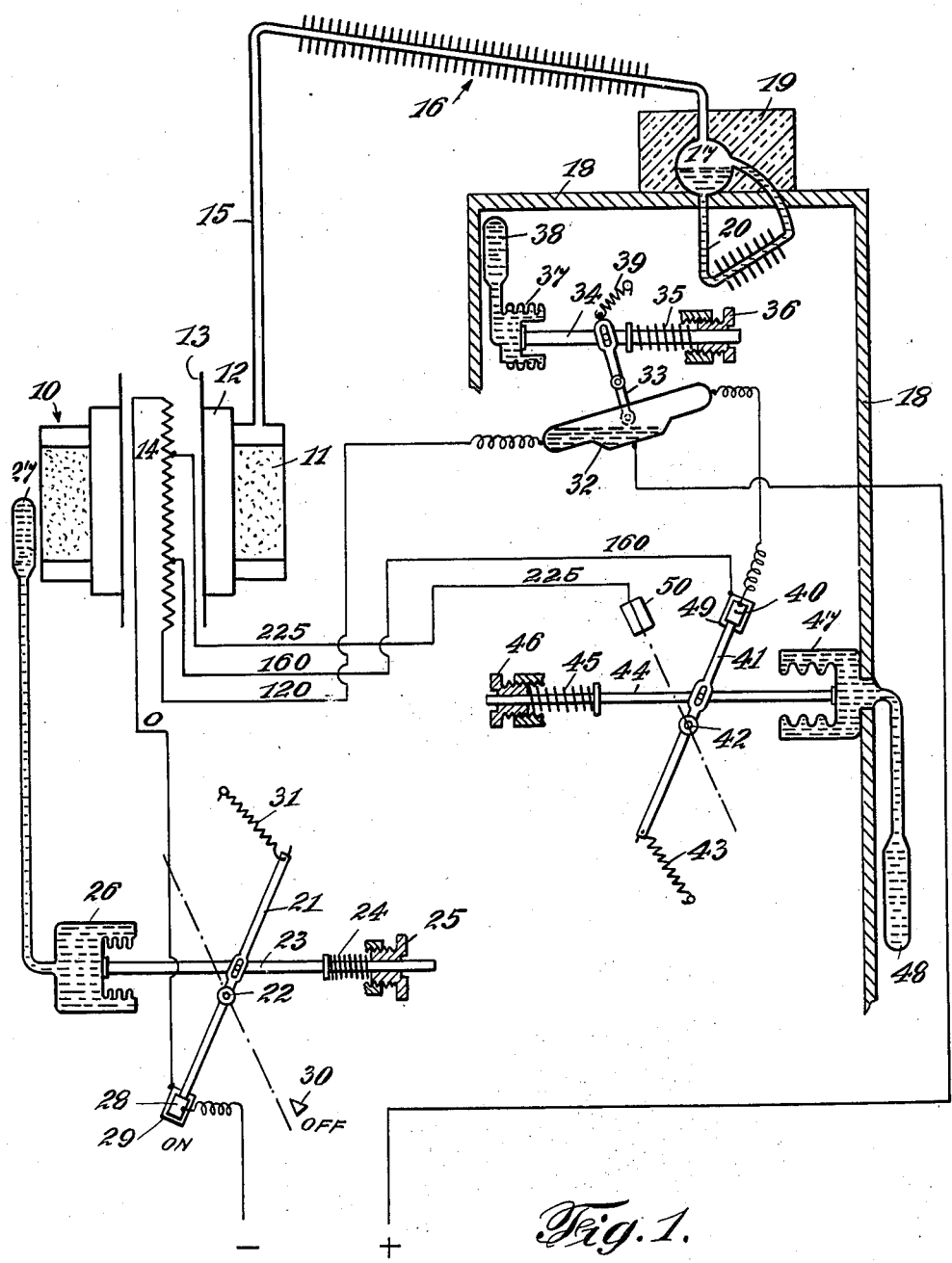
Fig. 1 is a diagrammatic view of an absorption refrigerating system having a single unit, and illustrating one form of thermostat control system according to the invention.

In the drawings, referring more particularly to Fig. 1, an absorption refrigerating system including a single intermittent unit is diagrammatically illustrated comprising the usual boiler absorber 10 having an annular compartment containing solid absorption material 11, an inner annular cooling jacket 12, and a central vertical flue 13, in which is disposed any suitable heating means such for example as an electrical heating cartridge 14 to heat the boiler absorber for the generating period. From the boiler absorber 10, the gaseous refrigerant passes upwardly through the conduit 15 into the condenser 16, where it is condensed and flows to an accumulator or collecting vessel 17 located in the upper portion of the refrigerator cabinet 18 and preferably surrounded by insulating material 19. From the accumulator 17, the liquid refrigerant flows through the evaporator 20 shown in the form of a coil pipe extending into the cabinet 18. During the absorption period, the boiler absorber 10 is cooled by any suitable means (not shown) and the refrigerant evaporated in the evaporator returns to the boiler absorber to be absorbed by the solid absorbent material 11.

The operation of the unit from one phase to the other is automatically controlled by the usual thermostat switch device comprising a switch lever 21 fulcrumed intermediate its ends as at 22, and operatively connected to a transverse rod 23 movable in one direction by a coil spring 24 adjustable by means of threaded nut 25, said transverse rod 23 being movable in the opposite direction against the tension of the spring 24 by a bellows diaphragm 26 responsive to a fluid pressure system 27 influenced by the temperature of the boiler absorber 10. One end of the switch lever 21 carries an electrode 28 connected to a suitable source of electric current and adapted to cooperate on the one hand with a stationary electrode 29 arranged on one side of the switch lever and electrically connected to the heat cartridge 14, and on the other hand with an abutment 30 disposed on the opposite side of the switch lever 21 so that upon rocking movement of the switch lever from one position to the other, the heat cartridge 14 will be intermittently energized and de-energized. A snap spring 31 cooperates with the switch lever 21 to yieldably maintain the latter in either of its extreme positions.

The heat cartridge 14 is adapted to be energized through separate circuits to produce respectively different amounts of heat, three circuits being illustrated by way of example in the drawings. For convenience, feed line from the source of current has been designated O and the feed lines of the three separate circuits have been designated by their voltage 120, 160 and 225 representing minimum or low, medium, and maximum or high heat values, respectively. The minimum, or low heat, 120, is connected to one end of a mercury switch 32, supported on the lower end of a rocking lever 33 operatively connected to the transverse operating rod 34 of a thermostat arranged in the cabinet 18. The rod 34 is movable in one direction by a coil spring 35 adjustable by means of threaded nut 36 and is movable in the opposite direction by a bellows diaphragm 37 responsive to a fluid pressure system 38 influenced by the temperature in the cabinet 18. The mercury switch 32 is yieldably maintained in either of its extreme positions by a snap spring 39 which cooperates with one end of rocking lever 33.

The opposite end of the mercury switch 32 is electrically connected to a movable electrode 40 carried on the upper end of a rocking switch lever 41 fulcrumed intermediate its ends as at 42 and connected at its lower end to a snap spring 43. The switch lever 41 is operatively connected to the transverse operating rod 44 of a thermostat responsive to room temperature conditions, said rod being movable in one direction by coil spring 45 and in the opposite direction by a bellows diaphragm 47 responsive to a fluid pressure system 48 influenced by the temperature outside the cabinet 18. The tension of the spring 45 can be regulated by means of threaded nut 46 to pre-load the bellows diaphragm for different operating conditions.

In one position of the switch lever 41, the electrode 40 engages a complementary electrode 49 connected to feed line 160 of the heat cartridge 14, while in the other position of the switch lever, its electrode 40 engages a complementary electrode 50 connected to feed line 225 of the heat cartridge.

The operation of the control system just described, is believed obvious, it being clear that the cabinet thermostat will operate to regulate the amount of heat supplied to the boiler absorber 10 between a predetermined minimum, through line 120, and a variable maximum, through line 160 or 225, selectively determined by the room thermostat. In other words, as long as the cabinet temperature remains at a predetermined level for which the cabinet thermostat has been adjusted, the mercury switch 32 will occupy the position shown in the drawings and the heat cartridge 14 will be energized through line 120 to supply minimum or low heat to the boiler absorber 10. However, when the cabinet temperature rises above the predetermined level, the cabinet thermostat will rock the mercury switch 32 to its opposite position so that the heat cartridge 14 will be energized either through line 160 to supply a medium amount of heat, or line 225 to supply the maximum amount of heat, dependent upon the position of the switch lever 41 in response to the room thermostat.

Figure 2:
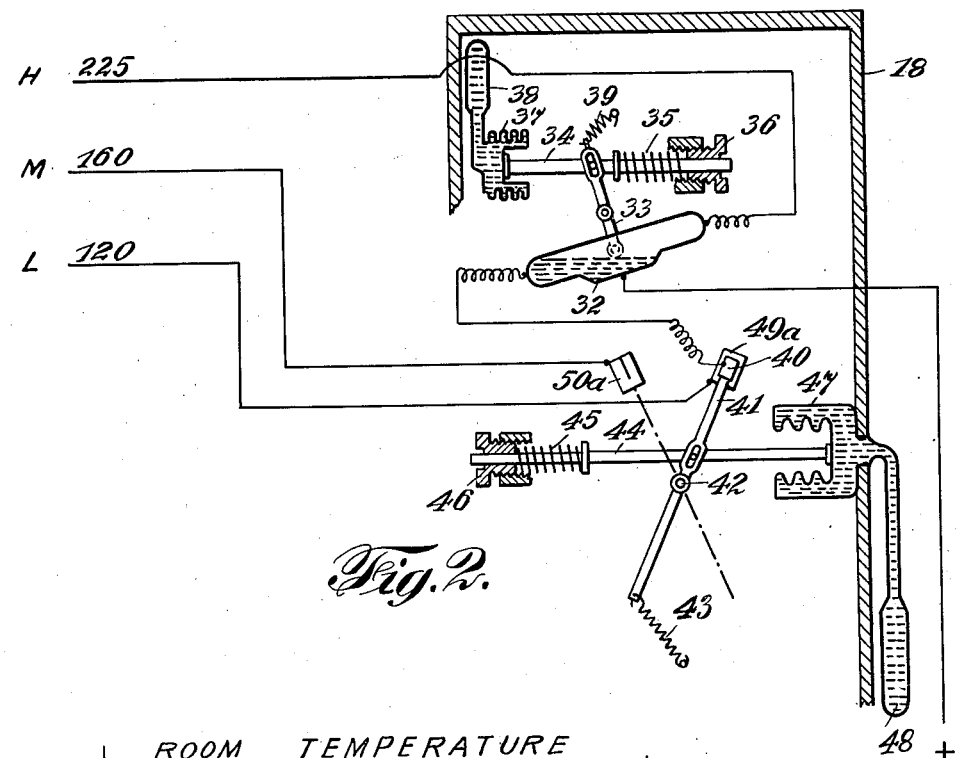
Fig. 2 is a detail diagrammatic view with parts broken away and in section, showing a modified form of control system.

In Fig. 2, the mercury switch 32 is shown electrically connected on one side to a movable electrode 40 on switch lever 41, while its other side is connected to the feed line 225. The stationary electrode 49a in this instance is connected to the feed line 120, and electrode 50a is connected to the feed line 160. Thus, in this form of control system, the cabinet thermostat operates to regulate the amount of heat supplied to the boiler absorber between a variable minimum, either through line 120 or line 160, selectively determined by the room thermostat, and a predetermined maximum through line 225.

Figure 3:
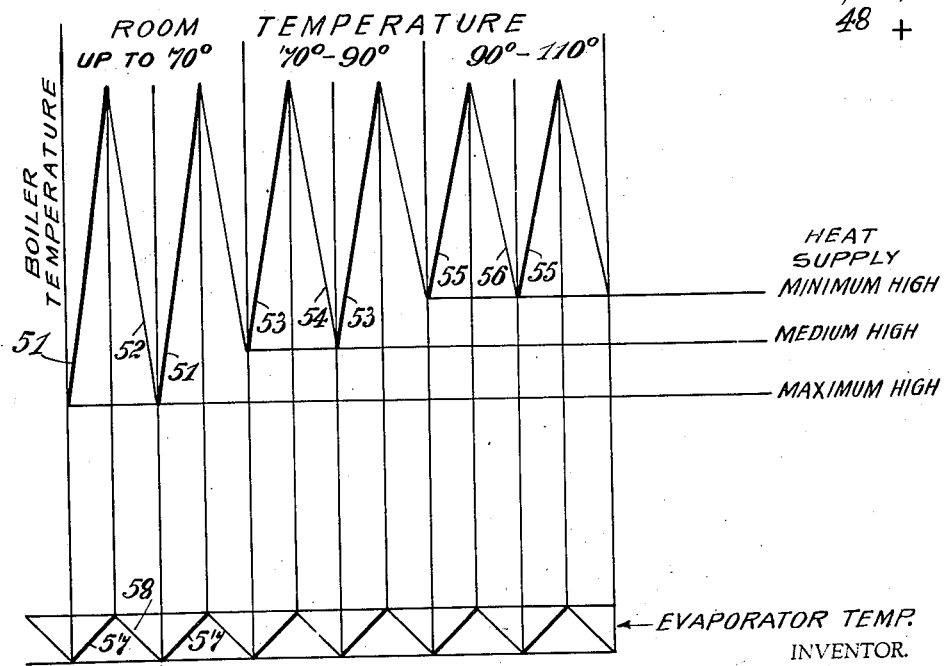
Fig. 3 is a temperature chart graphically illustrating the operating conditions of an absorption refrigerating unit for different room temperatures.

Referring to Fig. 3, the temperature conditions in the boiler absorber of an air-cooled absorption refrigerating unit of the intermittent type are graphically illustrated, where it is desired to maintain predetermined temperature conditions in the evaporator substantially constant for three different temperature conditions outside a refrigerator cabinet. In view of the fact that in a refrigerating system of this type the boiler absorber cannot be cooled down during each absorption period to below a few degrees above the room temperature, and that the upper limit of the boiler temperature range is fixed, it follows that with an increasing room temperature a correspondingly decreasing amount of heat is required for each generating period. For example, for a room temperature up to 70° F., the rise in temperature in the boiler absorber for each generating period will follow the heavy line 51 in Fig. 3 and the corresponding temperature drop in the boiler during each absorption period will follow lighter line 52. For a room temperature from 70° F. to 90° F., the temperature rise and the corresponding temperature drop in the boiler will follow heavy line 53 and lighter line 54, respectively, while for the room temperature from 90° F. to 110° F., the temperature rise and corresponding temperature drop will follow heavy line 55 and lighter line 56, respectively. For the three temperature ranges mentioned, the temperature in the evaporator will follow heavy line 57 during each generating or heating period, and lighter line 58 during each absorption period.

It will thus be observed that for a room temperature up to 70° F., more heat is required for the boiler absorber than for either of the other two ranges of room temperature, and that for a room temperature from 90° F. to 110° F., less heat is required for the boiler than for a room temperature from 70° F. to 90° F.

Figure 3A:
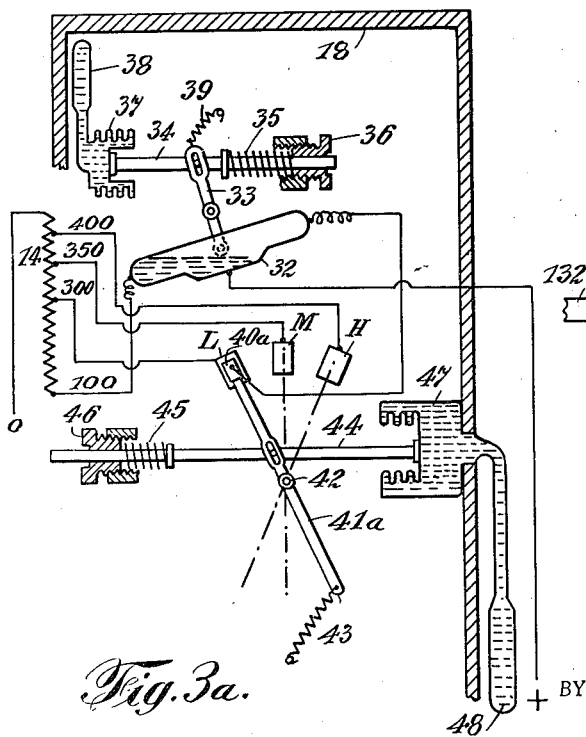
Fig. 3a is a diagrammatic view of a modified form of thermostat control system for the operating conditions illustrated in Fig. 3.

For this type of operation, an arrangement similar to that shown in Fig. 3a can be used wherein the heat cartridge 14 has four feed lines, 100, 300, 350 and 400, respectively. One side of the mercury switch 32 is connected to feed line 100, while its opposite side is electrically connected to the electrode 40a of the room thermostat switch lever 41a. The electrode 40a in this arrangement is adapted to cooperate with three separate stationary electrodes L, M and H connected to feed lines 300, 350 and 400, respectively. It will thus be observed that with this control system, the cabinet thermostat operates to regulate the supply of heat to the refrigerating system from a predetermined low (100) to a variable high, either minimum high (300), medium high (350), or maximum high (400), dependent on the room temperature outside the refrigerator cabinet. In other words for a room temperature up to 70° F. for example, the cabinet thermostat will operate to energize the heat cartridge 14 either through feed line 100, or feed line 400; for a room temperature from 70° F. to 90° F., the heat cartridge will be energized either through feed line 100 or feed line 350, and with a room temperature from 90° F. to 110° F., the heat cartridge will be energized either through feed line 100 or feed line 300.

Figure 4:
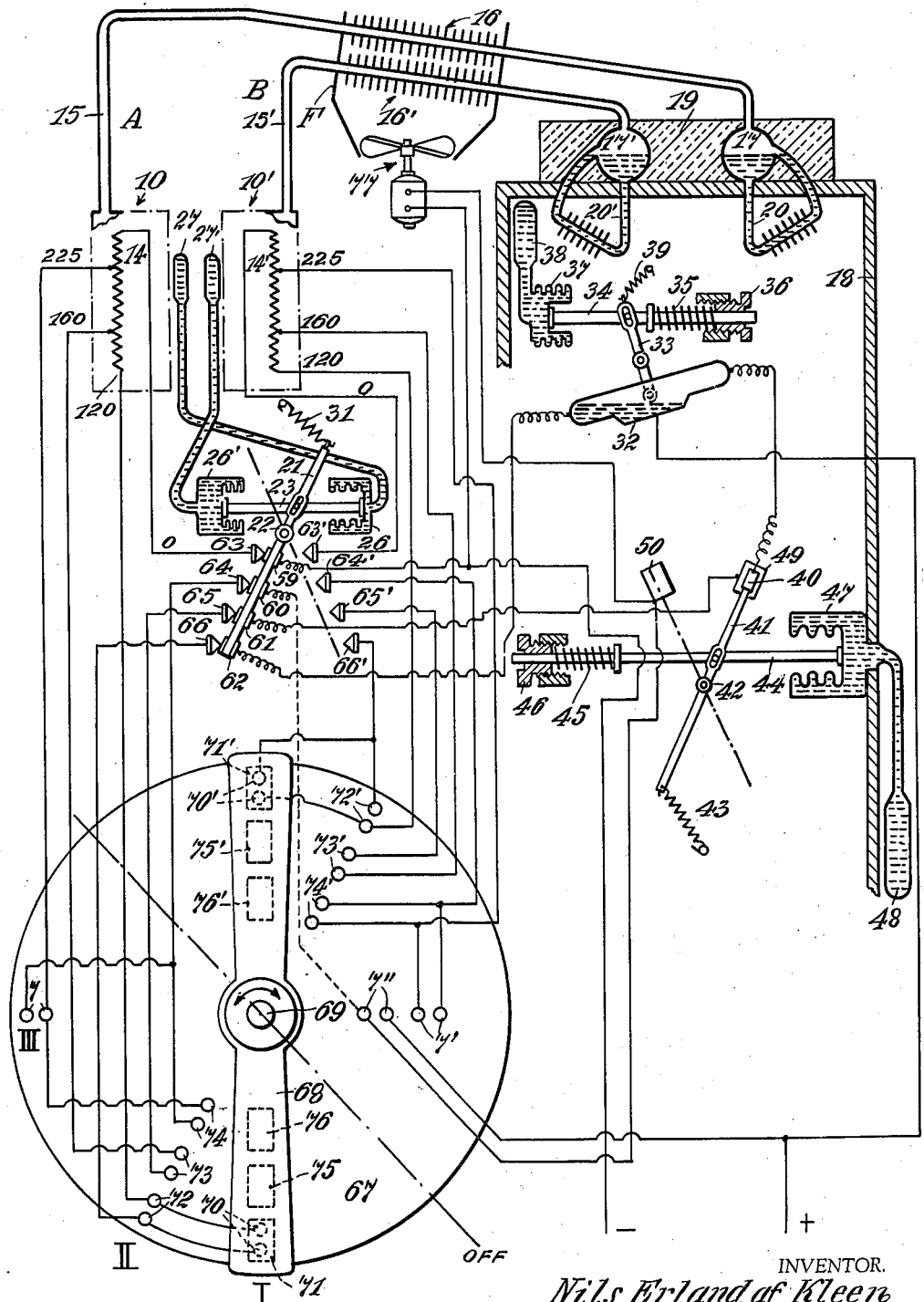
Fig. 4 is a view similar to Fig. 1, but showing the control system applied to absorption refrigerating apparatus having two units operating in phase, and an adjustable control device.

Referring to Fig. 4, the control system previously described is shown applied to an absorption refrigerating system having two intermittently and alternately operating units generally indicated as A and B, respectively, each similar to the unit heretofore described in connection with Fig. 1. For convenience, the various parts of unit A have been designated by the same reference characters used in Fig. 1 while the corresponding parts of unit B have been distinguished by the prime of the numeral.

The operation of the units A and B from one phase to the other is automatically controlled by a thermostat switch similar to that shown in Fig. 1 with the exception that the transverse rod 23 operatively connected to the switch lever 21 is movable in opposite directions by oppositely disposed bellows diaphragms 26 and 26', the former responsive to the fluid pressure system 27 influenced by the temperature of boiler absorber 10 and the latter responsive to a fluid pressure system 27' influenced by the temperature of the boiler absorber 10'.

In this installation, the switch lever 21 carries a plurality of electrodes 59, 60, 61 and 62 adapted to cooperate in one position of the switch lever 21 with a similar number of complementary electrodes 63, 64, 65 and 66, respectively, arranged on one side of the switch lever and, in the other position of the switch lever, electrodes 59, 60, 61 and 62 cooperate with a like number of complementary electrodes 63', 64', 65' and 66', respectively, arranged on the opposite side of the switch lever. The switch lever electrode 59 is electrically connected to a source of current, for example, the negative or minus line, while the stationary electrodes 63 and 63' are connected to the O feed lines of the heat cartridges 14 and 14', respectively. One side of the mercury switch 32 controlled by the cabinet thermostat is electrically connected to the switch lever electrode 62, while the other side of the mercury switch is similarly connected to the switch lever electrode 40 of the room thermostat. The stationary electrodes 49 and 50 of the room thermostat are electrically connected to the switch lever electrodes 61 and 60, respectively.

The refrigerating system illustrated in Fig. 4 also includes a control device generally similar to that shown and described in my copending application Serial No. 369,780, filed December 12, 1940, covering Control mechanism for refrigerating apparatus. The control device is generally indicated as 67 and has an arm 68 rotatable about a central axis 69 and adjustable from a position marked "Off" when the refrigerating system is not in operation, to three separate operating positions marked "I," "II" and "III," respectively, for different conditions of operation of the refrigerating system.

For position "I," the control device 67 is provided on its upper face with two diametrically opposed pairs of contacts 70 and 70', the former adapted to be engaged by a circuit-closing brush 71 arranged on the underside of one end of the arm 68, and the latter by a similar brush 71' on the opposite end of the arm 68. One of the contacts 70 is connected to the stationary electrode 66 and the other is connected to the line 120 of heat cartridge 14, while one of contacts 70' is connected to the stationary electrode 66' and the other is connected to line 120 of heat cartridge 14'.

For this position of the control device, the cabinet thermostat and the room thermostat will be inoperative to regulate the amount of heat supplied for the reason that the heat cartridges 14 and 14' will be intermittently and alternately energized only through the minimum line 120. Consequently, the units A and B will operate to produce only sufficient cold to maintain a cool temperature in the cabinet 18 but not necessarily sufficient to freeze water.

For position "II" on the control device 67, which position represents the normal operating conditions of the refrigerating system, the control device has three separate pairs of contacts 72, 73 and 74 on its upper face adapted to be engaged by circuit-making brushes 71, 75 and 76, respectively, on one end of the arm 68. Diametrically opposite the above mentioned three pairs of contacts, the control device 67 has three more pairs of contacts 72', 73' and 74' adapted to be engaged by brushes 71', 75' and 76', respectively, on the other end of the arm 68. One of the contacts 72 is connected to the line 120 of the heat cartridge 14 and the other of said contacts is connected to the stationary electrode 66. One of the contacts 73 is connected to feed line 160 of heat cartridge 14 and the other is connected to electrode 65. One of contacts 74 is connected to feed line 225 of the heat cartridge 14 and the other is connected to electrode 64. The contacts 72', 73' and 74' are similarly connected to the corresponding feed lines 120, 160 and 225 of heat cartridge 14' and the corresponding electrodes 66', 65' and 64'.

Thus, with the arm 68 occupying position "I" on the control device 67, the heat cartridges 14 and 14' can be energized through three different circuits to supply correspondingly different amounts of heat to the boiler absorbers 10 and 10', respectively, and the control system illustrated will operate as follows: The cabinet thermostat will regulate the amount of heat from a predetermined minimum to a variable maximum, either medium or high, selectively determined by the room thermostat. In other words, with the mercury switch 32 occupying the position shown, the heat cartridges 14 and 14' will be intermittently and alternately energized through their corresponding feed lines 120. As the temperature rises in the cabinet 18 sufficiently to permit bellows diaphragm 37 to rock mercury switch 32 to its opposite position, the heat cartridges will then be energized through their feed lines 160 for a predetermined room temperature when electrode 40 of switch lever 41 contacts electrode 49, or the heat cartridges will be energized through their feed lines 225 if the room temperature rises sufficiently to rock switch lever 41 to the position when electrode 40 contacts electrode 50.

In order to increase the efficiency of condensers 16 and 16' when the maximum heat is supplied to the corresponding boiler absorbers 10 and 10', I have shown a motor-driven fan assembly 77 disposed in the lower portion of a flue F in which is arranged the condensers 16 and 16'. The motor of the fan assembly is electrically connected to the negative line of the current source and to the electrode 50 so that whenever the heat cartridges 14 and 14' are energized through feed lines 225, the motor of the fan assembly 77 will also be energized to operate the fan.

For position "III" on the control device 67, a pair of contacts 7 are adapted to be engaged by brush 71 on the arm 68 and, diametrically opposite to contacts 7, two separate pairs of contacts 7' and 7" are provided on the control device 67 adapted to be engaged by the brushes 75' and 76', respectively, on the arm 68. One of the contacts 7 is connected to the feed line 225 of cartridge 14 and the other is connected to electrode 64, while contacts 7' are similarly connected to feed line 225 of cartridge 14' and electrode 64' respectively. One of the contacts 7" is connected to the fan assembly 77 while the other is connected to the positive line of the current source.

It will thus be seen that with the arm 68 occupying position "III" on the control device 67, the heat cartridges 14 and 14' will be intermittently and alternately energized only through feed lines 225 to supply maximum heat to the respective boiler absorbers 10 and 10' and the motor of the fan assembly 77 will be continuously energized, the cabinet and room thermostats being inoperative to regulate the amount of heat supplied. For this position of the control device 67 the cycles of the units A and B will naturally be shorter than for either of the first two positions of the control device with the result that quicker freezing conditions and consequently lower temperatures will be produced in the cabinet 18.

Figure 5:
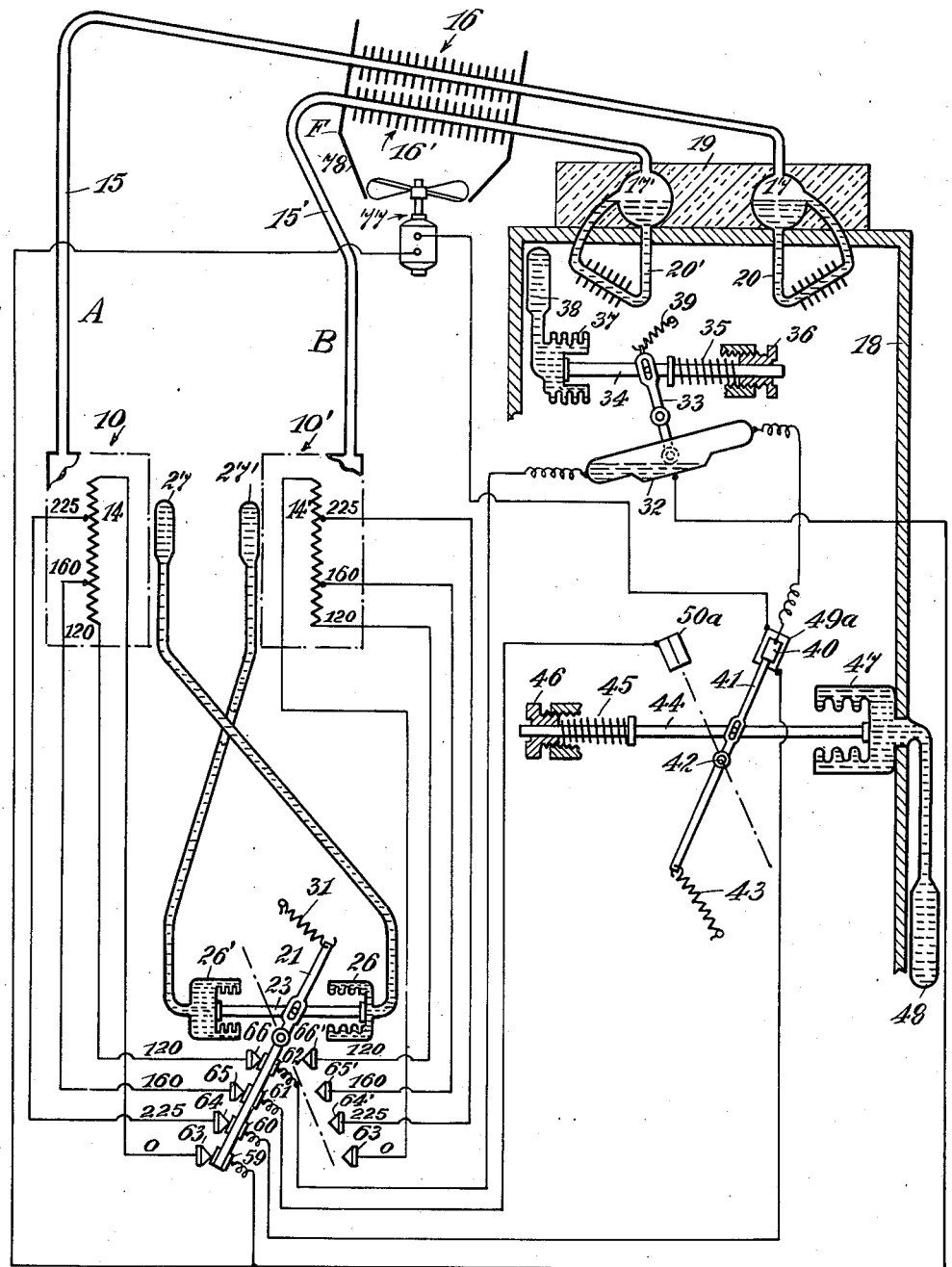
Fig. 5 is a view similar to Fig. 4 but without the control device and showing a slightly different arrangement of the control system.

The absorption refrigerating system illustrated in Fig. 5 is the same as that just described in connection with Fig. 4 with the exception that no control device is used for adjusting the operation of the refrigerating system for different conditions. Furthermore, a slightly different arrangement of control system is shown. Instead of increasing the amount of heat supplied to the boiler absorbers from minimum or low, to maximum or high, with a rise in room temperature, the control system of Fig. 5 will decrease the amount of heat relatively with rising room temperature. As shown in the drawing, one side of the mercury switch 32 is connected to electrode 62 of switch lever 21 and its opposite side is connected to electrode 40 of switch lever 41. However, instead of being connected to electrode 61 of switch lever 21 as shown in Fig. 4, the electrode 49a is connected to electrode 69 cooperating with the electrodes 64 and 64' controlling maximum feed lines 225, while electrode 50a is connected to electrode 61.

The operation of the foregoing system is believed obvious without further description.

In Fig. 6, the control system is applied to a gas installation for regulating the amount of gas supplied to a gas burner 78 employed as the source of heat for the refrigerating apparatus instead of the electrical heating system heretofore described. The gas flows from a suitable source indicated in the drawings as "Main gas line" through three branch conduits 79, 80 and 81, each provided with a valve for regulating the amount of gas passing therethrough; for example, a predetermined minimum amount through each of conduits 79 and 80 and a predetermined maximum amount through conduit 81. The conduit 79 terminates in communication with a valve chamber 82 in which is arranged a valve 83 carried on one end of the pivoted switch lever 33a of the cabinet thermostat for controlling the admission of gas into said chamber from either conduit 79 or from a branch conduit 84 leading from conduit 81 and connected into the valve chamber 82 adjacent conduit 79. A valve 85, carried on one end of the pivoted switch lever 41a of the room thermostat, is interposed in the branch conduit 84 and is provided with a segmental opening 86 for varying the cross-sectional area of the conduit passage, whereby variable amounts of gas can flow through the conduit 84, depending upon the room temperature. From the valve chamber 82, the gas flows through conduit 87.

Each of the conduits 80, 81 and 87 terminates in communication with a master control valve generally indicated as 88 which is adjustable from a position marked "Off" to positions "I," "II," "III" for controlling the operation of the refrigerating system for different operating conditions, similar to the control device 67 heretofore described in connection with Fig. 4. As clearly shown in Figs. 7 and 8, the master control valve consists of a casing 89 into which the conduits 80, 87 and 81 are connected corresponding to positions "I," "II," and "III," respectively, indicated on the upper face of the casing. A valve member 90 rotatably mounted in the casing is drilled longitudinally from one end to provide a central bore 91 which terminates at its inner end in communication with a transverse radial inlet opening 92 provided in an enlarged portion of the valve member and adapted to register with any one of the openings formed by the conduit connections 80, 81 and 87, upon rotation of the valve, to form an inlet passage for the gas. The outer end of the bore 91 is closed by any suitable means such as a threaded plug 93. The opposite end of the valve member 90 terminates in a reduced stem portion 90a which projects through the upper face of the casing 89 and carries a transverse arm or pointer 94 to indicate the different positions of the valve member 90.

A second transverse radial opening 95 is provided in a reduced portion of the valve member 90 for the passage of the gas from the central bore 91 into a gas chamber 96 in the casing 89 from which the gas flows through outlet conduit 97 connected into the casing 89 corresponding to the "Off" position of the master control valve 88. A radially projecting lug 98 carried on the reduced portion of the valve member 90 in the plane of the outlet conduit connection 97 is adapted to close the opening in said outlet connection when the valve member 90 is rotated to the "Off" position and to open the same when the valve member is rotated to positions "I," "II" or "III."

With the valve member 90 adjusted to position I, its radial opening 92 will register with conduit connection 80 so that only a predetermined minimum amount of gas will flow from the "Main gas line" to the outlet conduit 97. However, with the valve member 90 rotated to position II, its opening 92 will register with branch conduit connection 87 and the gas will flow either through conduit 79 from the "Main gas line," or branch conduit 84, depending upon the cabinet temperature. In other words, if the predetermined temperature for which the cabinet thermostat has been adjusted exists in the cabinet or region being cooled, the valve 83 will occupy the position shown in Fig. 6 and a predetermined minimum amount of gas will flow through conduits 79, 87 and 97 to the burner 78.

When the aforesaid temperature changes, the cabinet thermostat will then move valve 83 across conduit 79 to close the latter and open branch conduit 84, thereby permitting more gas to flow to the burner 78, the amount of which is regulated by the valve 85 controlled by the room thermostat in accordance with the room temperature.

With the valve member 90 adjusted to position III, its radial opening 92 will register with conduit connection 81 and only a predetermined maximum amount of gas will flow to the burner 78, the thermostat valves 83 and 85 being inoperative in this position of the valve member to regulate the amount of gas supplied.

Referring to Fig. 10, another form of gas installation is shown including a housing 99 divided centrally by a transverse partition 100 to provide two separate gas chambers 101 and 102 into which the gas enters through branch conduits 103 and 104, respectively, from a main gas line 105. A third branch conduit 106 from the main gas line 105 is connected to the inlet end of a central bore 107 extending longitudinally through the partition 100 and terminating at its outlet end in communication with an outlet conduit 108 leading to a gas burner (not shown). Preferably, each of the branch conduits 103, 104 and 106 is provided with a valve 103a, 104a and 106a, respectively, to regulate the amount of gas flowing therethrough, for example, a predetermined minimum amount through branch conduit 103 and a predetermined maximum amount through branch conduit 104, while only a sufficient amount of gas is permitted to flow through branch conduit 106 to maintain a pilot flame in the burner.

The partition 100 is provided with a transverse opening 109 extending from one gas chamber to the other for the passage of gas from chamber 102 to chamber 101. A second transverse opening 110 in the partition 100 extends from chamber 101 to the central bore 107 for the passage of gas to the burner. The amount of gas entering central bore 107 from the chamber 101 is regulated within a predetermined range by any suitable valve 111 operated by the cabinet thermostat, the valve shown in the drawings being in the form of a circular plate rotatable in the chamber 101 about a central axis 112 projecting outwardly from one side of the partition 100. The valve plate 111 has a cut out segmental slot 113 adapted to cooperate with the opening 110 for varying the cross-sectional area of the gas passage to permit the flow of different amounts of gas into the central bore 107 for delivery to the burner. The valve plate 111 is rotated in response to the temperature in the cabinet or region being cooled, by means of an arm 114 eccentrically mounted on one side of the plate and connected to the reciprocatable rod 34a of the bellows diaphragm 37a responsive to a fluid pressure system 38a partially shown but leading to the cabinet or region being cooled.

The amount of gas supplied from chamber 102 to chamber 101 is regulated by a valve plate 115 similar to valve plate 111 but rotatable in the gas chamber 102 about a central axis 116 in response to the temperature outside the cabinet. Valve plate 115 is provided with a segmental cut out slot 117 which cooperates with the opening 109 to vary the cross-sectional area of the gas passage, whereby different amounts of gas can pass from chamber 102 into chamber 101. The valve plate 115 is rotated about its axis 116 by means of an arm 118 eccentrically mounted on one side of the valve plate and operatively connected to the reciprocatable rod 44a of the bellows diaphragm 47a responsive to a fluid pressure system 48a influenced by the temperature outside the cabinet.

In operation, gas will flow continuously to the gas chambers 101 and 102 through the respective branch conduits 103 and 104. The cabinet thermostat will control the valve plate 111 to permit the flow of gas from the chamber 101 to the burner between a predetermined minimum and a variable maximum, determined by the room thermostat controlling the valve plate 115.

Figures 12, 13:
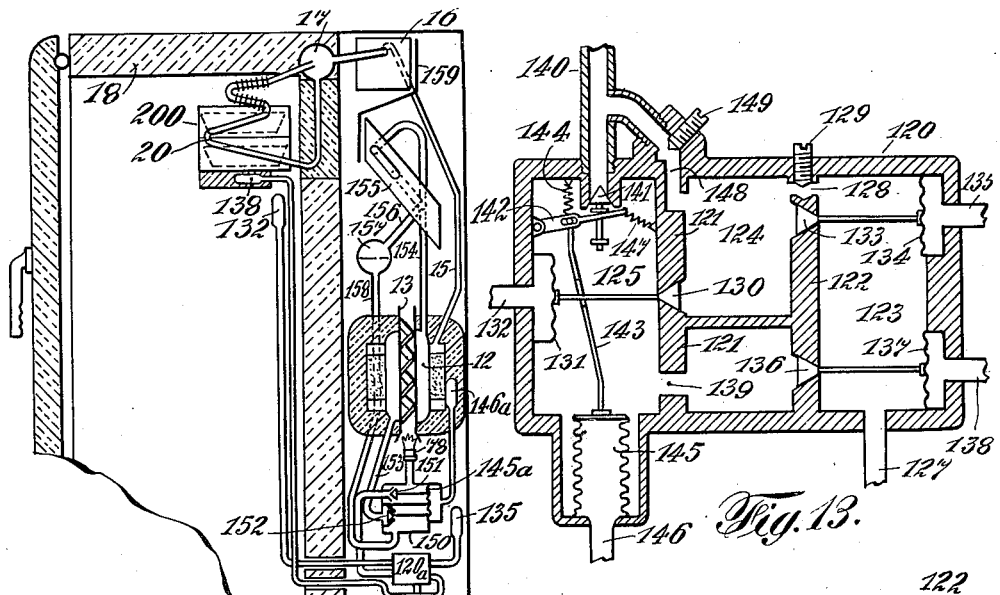
Fig. 12 is a vertical sectional view through a refrigerator cabinet illustrating diagrammatically a complete absorption refrigerating unit with a modified form of thermostat control system, responsive to three separate reaction impulses namely, evaporator, cabinet and room, for regulating the amount of gas supplied to the burner.
Fig. 13 is an enlarged sectional view of a unitary thermostat control arrangement generally similar to that illustrated in Fig. 12.

Referring to Fig. 13, a further embodiment of the invention is illustrated wherein all of the thermostat valves required to control the supply of heat and to regulate the amount of heat supplied to a refrigerating system are arranged in a common housing or casing 120 to provide a unitary thermostat control device. The housing 120 is divided by means of vertical partitions 121 and 122 into an inlet chamber 123, an intermediate chamber 124 and an outlet chamber 125. A horizontal partition 126 divides the intermediate chamber 124 into an upper compartment and a lower compartment. Gas is supplied to the inlet chamber 123 through conduit 127 leading from a suitable source (not shown). The partition 122 is provided with a transverse opening 128, the size of which can be adjusted by threaded plug 129 for the passage of a predetermined amount of gas from the inlet chamber 123 to the intermediate chamber 124.

From the intermediate chamber 124 to the outlet chamber 125, the passage of gas is controlled by a valve 130 cooperating with a valve seat formed by a transverse opening in the partition 121. Valve 130 is actuated by a bellows diaphragm 131 arranged in one side of the housing 120 and responsive to a fluid pressure system 132 partially shown but leading to the cabinet and influenced by the temperature therein. A similar valve 133 operable by a bellows diaphragm 134 arranged in the opposite side of the housing 120 and responsive to a fluid pressure system 135, cooperates with a valve seat forming an opening in the partition 122 to regulate the amount of gas supplied to the upper compartment of the intermediate chamber 124 according to temperature conditions outside the cabinet. A third valve 136, operatively connected to a bellows diaphragm 137 adjacent bellows 134 but responsive to fluid pressure system 138 influenced by the evaporator temperature of the refrigerating system, cooperates with a valve seat formed by another transverse opening in the partition 122 to regulate the amount of gas supplied to the lower compartment of the intermediate chamber 124. A transverse opening 139 in the partition 123 establishes communication between the lower compartment of the intermediate chamber 124 and the outlet chamber 125 from which outlet chamber the gas flows through conduit 140 to a burner (not shown).

The flow of gas through the outlet conduit 140 to the burner is automatically controlled by the usual thermostat switch device shown in the form of a valve 141 slidably supported on one end of a pivoted arm 142 in the outlet chamber 125. The valve 141 is actuated by a rod 143 operatively connected to the pivoted arm 142 and movable in a direction to open the valve by means of a coil spring 144, said rod being movable in a direction to close the valve by a bellows diaphragm 145 responsive to a fluid pressure system 146 influenced by the temperature in the boiler absorber (not shown). A snap spring 147 cooperates with the free end of the pivoted arm 142 to yieldably maintain the valve 141 in either its fully closed or fully open positions.

In order to maintain a pilot flame for the burner, a by-pass conduit 148 is provided leading from the upper compartment of the intermediate chamber 124 to the outlet conduit 140 and, if desired, a threaded plug valve 149 may be interposed in the by-pass conduit to regulate the amount of gas flowing through the latter, thereby adjusting the pilot flame.

In Fig. 12, a refrigerator cabinet 18 is illustrated equipped with a single absorption refrigerating unit similar to that shown in Fig. 1 but including a gas burner 78 as the heating means for the boiler absorber for the generating phase operation, and a secondary cooling system for the circulation of a cooling medium through the boiler absorber jacket 12, for the absorption phase operation of the unit to cool the boiler absorber.

The supply of gas and the amount of gas supplied to the burner 78 are controlled by a unitary thermostat control device similar to that shown in detail in Fig. 13 with the exception that, for purposes of illustration, the gas outlet chamber is arranged in the gas compartment of a combined liquid and gas valve chamber 150 separate from the housing 120a and the bellows diaphragm 145a responsive to the fluid pressure system 146a in thermal contact with the boiler absorber 10, operates a pair of valves 151 and 152, the former arranged in the gas compartment of the valve chamber 150 to control the supply of gas to the burner 78, and the latter arranged in the liquid compartment of the valve chamber to control the circulation of the cooling medium through the secondary system. Valves 151 and 152 are oppositely disposed so that when one is closed, the other is open.

The cooling medium enters the bottom of the jacket 12 through a conduit 153 leading from the liquid compartment of the valve chamber 150 and passes upwardly through outlet conduit 154 leading to a secondary condenser 155 arranged below the primary condenser 16. From the condenser 155, the cooling medium flows through conduit 156 to a collecting vessel 157 and is delivered to the liquid compartment in the valve chamber 150 through conduit 158. In order to increase the efficiency of the air-cooled condensers 16 and 155, a baffle plate 159 is interposed between said condensers to divide the air into separate streams passing around the respective condensers.

The operation of the refrigerating unit just described is as follows:

The bellows diaphragm 145a will automatically control the operation of the unit from one phase to the other. For the absorption phase, the valve 151 will be closed to shut off the supply of gas to the burner 78, and the valve 152 will be opened to permit circulation of the secondary cooling medium through the boiler absorber jacket 12. For the generating phase, the valve 152 will be closed and the valve 151 opened. The fluid pressure system 132 of the cabinet thermostat will actuate valve 130 to regulate the flow of gas from a predetermined minimum to a variable maximum, determined by the room temperature which will actuate valve 133 through the fluid pressure system 135 of the room thermostat to increase the amount of gas supplied with an increasing room temperature. The third valve 136 actuated by the fluid pressure system 138 of the evaporator thermostat will be opened whenever the temperature adjacent the evaporator 20 increases, such for example when water is placed in the ice-trays of the ice-tray compartment 200 in the cabinet 18.

Figures 13A, 14:
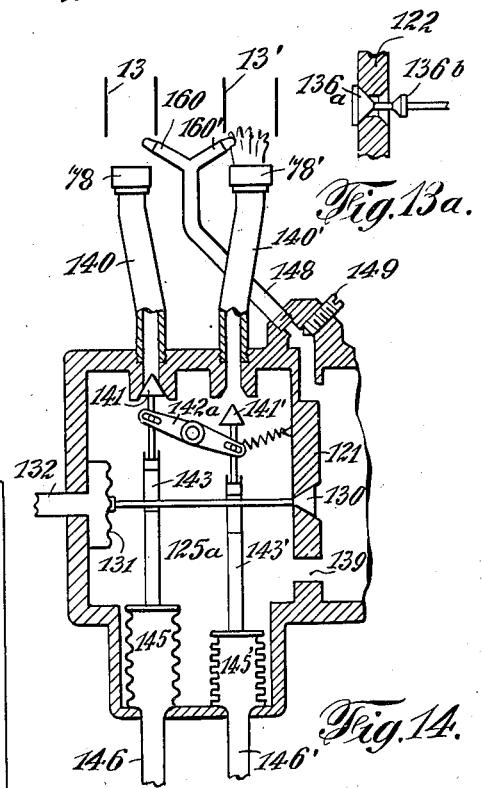
Fig. 13a is a fragmentary sectional detail of a modified form of one of the valves for use in the control system of Fig. 13 for the operating conditions illustrated in Fig. 3.
Fig. 14 is a fragmentary sectional view of a modified form of unitary control arrangement of Fig. 13.

For the operation of a refrigerating system requiring less heat with an increasing room temperature, such as shown in Fig. 3, a double valve arrangement illustrated in Fig. 13a may be employed in place of the valve 133 of Fig. 13. The double valve has a valve head 133a cooperating with a valve seat on one side of the partition 122 and an oppositely disposed valve head 133b spaced longitudinally from the valve head 133a and cooperating with a valve seat in the other side of the partition.

For a refrigerating system employing two intermittently operating units, the unitary thermostat control device of Fig. 13 can be modified along the lines suggested in Fig. 14, wherein the gas outlet chamber 125a accommodates a pair of alternately operating valves 141 and 141', the former controlling the flow of gas through outlet conduit 140 to the burner 78 in the flue 13 of one of the units, and the latter controlling the flow of gas through a second outlet conduit 140' leading to another burner 78' in the flue 13' of the other unit. Valve 141 is actuated by the operating rod 143 of the bellows diaphragm 145 responsive to the fluid pressure system 146 in thermal contact with the boiler absorber of one unit, while valve 141' is actuated by operating rod 143' of a second bellows diaphragm 145' responsive to a fluid pressure system 146' in thermal contact with the boiler absorber of the other unit. Valves 141 and 141' are operatively connected to the opposite ends of a fulcrumed lever 142a cooperating with a snap spring 147a to yieldably maintain said valves in either of their extreme positions. The by-pass conduit 148 in this form of the control device terminates in diverging pilot jets 160 and 160' adjacent the burners 78 and 78', respectively.

It will thus be seen from the foregoing description that I have provided a control system which will automatically increase the quantity of energy supplied to that type of energy-producing unit requiring such increased amount with an increasing difference between the temperature inside and that outside the mass, body, space, cabinet and the like; that the control system herein disclosed can also be used to supply a relatively decreasing amount of energy to that type of energy-producing unit requiring the same with an increasing temperature difference, and that the control system, while responsive to different conditions at a plurality of points, is centralized into a compact unitary arrangement from which the impulse lines lead to said plurality of points.

While I have shown several embodiments of my control system applied to refrigerating systems of the direct expansion type, it is to be understood that the invention is not to be confined in this respect, as obviously the control system can also be applied in connection with refrigerating systems of the accumulative type using a storage tank having a eutectic mixture or a brine, or to refrigerating systems embodying a combination of the direct expansion and accumulative principles. Moreover, the invention is not to be limited in its use to refrigeration, but can be employed in connection with any system utilizing energy, such as direct and indirect heating systems, air conditioning systems, heat exchange systems, and the like, where it is desired to regulate the operation of such energy utilizing systems for different operating conditions.

From the foregoing it is believed that the construction, operation and advantages of the control system herein disclosed may be readily understood by those skilled in the art without further description, it being borne in mind that numerous changes may be made without departing from the spirit of the invention as set out in the following claims.

What I claim is:

1. In an absorption system of refrigeration operating to cool an enclosed space or the like to maintain a predetermined condition therein and including means for supplying heat to said system for the operation thereof; a unitary thermostat device including means responsive to the temperature in the space being cooled for regulating the supply of heat between a predetermined value and a variable value, and means responsive to the temperature outside the space being cooled for determining the value of said variant.

2. The combination with an absorption system of refrigeration operating to cool an enclosed space or the like to maintain predetermined conditions therein, a part of said system adapted to be supplied with heat from an outside source for the operation of said system, and another part of said system being arranged to produce refrigeration in said enclosed space; of thermostat means responsive to the temperature in the first named part of said system for controlling the supply of heat thereto, separate thermostat means responsive to the temperature in the second named part of said system for regulating the amount of energy supplied to said first named part, and a plurality of thermostat means separately responsive to the temperature inside and outside said space for regulating the amount of energy supplied to said first named part in accordance with the demands inside the space being cooled relative to the ambient temperature.

3. In absorption refrigerating apparatus operating to cool an enclosed space and the like and including refrigerant generating means adapted to be heated; the combination with heating means for said generating means; of means responsive to the temperature in the space being cooled for regulating the heat between a fixed value and a variable value, and separate means responsive to the temperature outside the space being cooled determining the value of said variant.

4. In absorption refrigerating apparatus operating to cool an enclosed space and the like and including refrigerant generating means adapted to be heated; the combination with heating means for said generating means; of means responsive to the temperature in the space being cooled for regulating the heat between a predetermined minimum and a variable maximum, and separate means responsive to the temperature outside the space being cooled determining the value of said variable maximum.

5. In absorption refrigerating apparatus operating to cool an enclosed space and the like and including refrigerant generating means adapted to be heated; the combination with heating means for said generating means; of means responsive to the temperature in the space being cooled for regulating the heat between a predetermined minimum and a variable maximum, and separate means responsive to the temperature outside the space being cooled determining the value of said variable maximum, the value of said variable maximum determined by said last named means varying directly in accordance with the ambient temperature variations.

6. In absorption refrigerating apparatus operating to cool an enclosed space and the like and including refrigerant generating means adapted to be heated; the combination with heating means for said generating means; of means responsive to the temperature in the space being cooled for regulating the heat between a predetermined minimum and a variable maximum, and separate means responsive to the temperature outside the space being cooled determining the value of said variable maximum, the value of said variable maximum determined by said last named means varying inversely with respect to the ambient temperature variations.

7. In absorption refrigerating apparatus operating to cool an enclosed space and the like and including refrigerant generating means adapted to be heated; the combination with heating means for said generating means; of means responsive to the temperature in the space being cooled for regulating the heat between a predetermined maximum and a variable minimum, and separate means responsive to the temperature outside the space being cooled determining the value of said variable minimum.

8. In absorption refrigerating apparatus operating to cool an enclosed space and the like and including refrigerant generating means adapted to be heated; the combination with heating means for said generating means; of means responsive to the temperature in the space being cooled for regulating the heat between a predetermined maximum and a variable minimum, and separate means responsive to the temperature outside the space being cooled determining the value of said variable minimum, the value of said variable minimum determined by said last named means varying directly in accordance with the ambient temperature variations.

9. In refrigerating apparatus of the intermittent absorption type operating to cool an enclosed space and including combined generating and absorbing means adapted to be heated intermittently, the combination with heating means for said combined generating and absorbing means, and mechanism controlling the operation of said heating means to heat said combined generating and absorbing means intermittently; of means responsive to the temperature in the space being cooled for regulating the heat supplied by said heating means between a fixed value and a variant, and separate means responsive to the temperature outside the space being cooled for determining the value of said variant.

10. In refrigerating apparatus of the intermittent absorption type operating to cool an enclosed space and including combined generating and absorbing means adapted to be heated intermittently, the combination with heating means for said combined generating and absorbing means, and mechanism controlling the operation of said heating means to heat said combined generating and absorbing means intermittently; of means responsive to the temperature in the space being cooled for regulating the heat supplied by said heating means between a predetermined minimum and a variable maximum, and separate means responsive to the temperature outside the space being cooled determining the value of said variant.

11. In refrigerating apparatus of the intermittent absorption type operating to cool an enclosed space and including combined generating and absorbing means adapted to be heated intermittently, the combination with heating means for said combined generating and absorbing means, and means controlling the operation of said heating means to heat said combined generating and absorbing means intermittently; of means responsive to the temperature in the space being cooled for regulating the heat supplied by said heating means between a predetermined minimum and a variable maximum, and separate means responsive to the temperature outside the space being cooled determining the value of said variant, the value of said variable maximum determined by said last named means varying inversely with respect to the ambient temperature variations.

12. In refrigerating apparatus of the intermittent absorption type operating to cool an enclosed space and including combined generating and absorbing means adapted to be heated intermittently; the combination with heating means for said combined generating and absorbing means, and means controlling the operation of said heating means to heat said combined generating and absorbing means intermittently; of means responsive to the temperature in the space being cooled for regulating the heat supplied by said heating means between a predetermined maximum and a variable minimum, and separate means responsive to the temperature outside the space being cooled determining the value of said variant.

13. In refrigerating apparatus of the intermittent absorption type operating to cool an enclosed space and including combined generating and absorbing means adapted to be heated intermittently, the combination with heating means for said combined generating and absorbing means, and means for controlling the operation of said heating means to heat said combined generating and absorbing means intermittently; of means responsive to the temperature in the space being cooled for regulating the heat supplied by said heating means between a predetermined maximum and a variable minimum, and separate means responsive to the temperature outside the space being cooled determining the value of said variant, the value of said variable minimum determined by said last named means varying directly in accordance with ambient temperature variations.

14. In refrigerating apparatus of the intermittent absorption type including at least two units operating in phase relation to each other for the production of substantially continuous refrigeration to cool an enclosed space, each unit having a boiler-absorber; the combination with heating means for said boiler-absorbers, and thermostat mechanism responsive to the temperature in each of said boiler-absorbers for selectively controlling the supply of heat to said boiler-absorbers; of thermostat means responsive to the temperature in the space being cooled for regulating the supply of heat to said boiler-absorbers between a fixed value and a variant, and separate thermostat means responsive to the temperature outside the space being cooled for determining the value of said variant.

15. In refrigerating apparatus of the intermittent absorption type including at least two units operating in phase relation to each other for the production of substantially continuous refrigeration to cool an enclosed space, each unit having a boiler-absorber; the combination with heating means for said boiler-absorbers, and thermostat mechanism responsive to the temperature in each of said boiler-absorbers for selectively controlling the supply of heat to said boiler-absorbers; of thermostat means responsive to the temperature in the space being cooled for regulating the supply of heat to said boiler-absorbers between a predetermined minimum and a variable maximum, and separate thermostat means responsive to the temperature outside the space being cooled determining the value of said variant inversely with respect to ambient temperature variations.

16. In refrigerating apparatus of the intermittent absorption type including at least two units operating in phase relation to each other for the production of substantially continuous refrigeration to cool an enclosed space, each unit having a boiler-absorber; the combination of heating means for said boiler-absorbers, thermostat control mechanism responsive to the temperature in each of said boiler-absorbers for selectively controlling the supply of heat to said boiler-absorbers, an adjustable control device movable to different positions for adjusting the amount of heat supplied to said boiler-absorbers for different operation conditions of the units, at least one position of said control device permitting the supply of variable amounts of heat to said boiler-absorbers, thermostat means responsive to the temperature in the space being cooled and operative at said one position of the control device for regulating the supply of heat to said boiler-absorbers between a predetermined minimum and a variable maximum, and separate thermostat means responsive to the temperature outside the space being cooled for determining the value of said variant.

17. In absorption refrigerating apparatus operating to cool an enclosed space and including a refrigerant evaporating unit arranged in the space to be cooled and refrigerant generating means arranged outside the said space; the combination of heating means for said generating means, thermostat means responsive to the temperature in the space being cooled for regulating the supply of heat between a fixed value and a variable value, separate thermostat means responsive to the temperature outside the space being cooled for determining the value of said variant, and means responsive to the temperature of said refrigerant evaporating unit for regulating the supply of heat independently of said first-named and second-named thermostat means.

18. In absorption refrigerating apparatus operating to cool an enclosed space and including refrigerant generating means and fuel burner means for heating the same; the combination with fuel supply means for said burner means; of thermostat valve means responsive to the temperature in the space being cooled for regulating the supply of fuel between a fixed value and a variable value, and separate thermostat means responsive to the temperature outside the space being cooled for determining the value of said variant.

19. In absorption refrigerating apparatus operating to cool an enclosed space and including refrigerant generating means and fuel burner means for heating said refrigerant generating means; a unitary thermostat control including a valve responsive to the temperature in the space being cooled for regulating between a fixed value and a variant the supply of fuel to said burner means in accordance with temperature variations in the space being cooled, and a second valve responsive to the temperature outside the space being cooled for determining the value of said variant in accordance with the ambient temperature.

20. In refrigerating apparatus of the intermittent absorption type operating to cool an enclosed space and including refrigerant generating means and fuel burner means for heating said refrigerant generating means; a unitary thermostat control including a valve responsive to the temperature in the space being cooled for regulating between a predetermined minimum and a variable maximum the supply of fuel in accordance with temperature variations in the said space, a second valve responsive to the temperature outside the space being cooled for determining the amount of said variable maximum in accordance with the ambient temperature, the amount determined by said second valve varying inversely with respect to variations in the ambient temperature, and valve means responsive to the temperature in said refrigerant generating means for controlling the so-regulated supply of fuel to said burner means.

21. In refrigerating apparatus of the intermittent absorption type including at least two units operating in phase relation to each other for the production of substantially continuous refrigeration to cool an enclosed space, each unit having a boiler-absorber and a fuel burner therefor; a unitary thermostat control including a valve responsive to the temperature in the space being cooled for increasing and decreasing the supply of fuel in accordance with temperature variations in the space being cooled, a second valve responsive to the temperature outside the space being cooled for varying the maximum amount of fuel regulated by said first-named valve in accordance with variations in the ambient temperature, and valve means responsive to the temperature in each of said boiler-absorbers for selectively controlling the so-regulated supply of fuel to said fuel burners.

22. In absorption refrigerating apparatus operating to cool an enclosed space and including refrigerant generating means, fuel burner means for heating said generating means, and refrigerant evaporating means; a unitary thermostat control including a valve responsive to the temperature in the space being cooled for increasing and decreasing the supply of fuel in accordance with temperature variation in said space, a second valve responsive to the temperature outside the space being cooled for varying the maximum amount of fuel regulated by said first named valve in accordance with variations in the ambient temperature, and a third valve responsive to the temperature of said refrigerant evaporating means for increasing and decreasing the supply of fuel to said burner means in accordance with temperature variations in said refrigerant evaporating means independently of the temperature in the space being cooled and of the ambient temperature.

23. In refrigerating apparatus of the intermittent absorption type operating to cool an enclosed space and including refrigerant generating means, fuel burner means for heating said generating means, and refrigerant evaporating means; a unitary thermostat control including a valve responsive to the temperature in the space being cooled for increasing and decreasing the supply of fuel in accordance with temperature variations in said space, a second valve responsive to the temperature outside the said space for varying the maximum amount of fuel regulated by said first named valve in accordance with variations in the ambient temperature, a third valve responsive to the temperature of said refrigerant evaporating means for increasing and decreasing the supply of fuel in accordance with temperature variations in said refrigerant evaporating means independently of the temperature in the space being cooled and of the ambient temperature, and valve means responsive to the temperature in said refrigerant generating means for controlling the so-regulated supply of fuel to said burner means.

24. In refrigerating apparatus of the intermittent absorption type including refrigerant evaporating means and at least two units operating in phase relation to each other, to flow liquid refrigerant substantially continuously to said refrigerant evaporating means for the production of substantially continuous refrigeration to cool an enclosed space, each unit having a boiler-absorber and a fuel burner therefor; a unitary thermostat control including a valve responsive to the temperature in the space being cooled for increasing and decreasing the supply of fuel in accordance with temperature variations in the said space, a second valve responsive to the temperature outside the space being cooled for varying the maximum amount of fuel regulated by said first named valve relative to the ambient temperature, a third valve responsive to the temperature of said refrigerant evaporating means for increasing and decreasing the supply of fuel in accordance with temperature variations in said refrigerant evaporating means independently of the temperature in the space being cooled and of the ambient temperature, and valve means responsive to the temperature in each of said boiler-absorbers for selectively controlling the so-regulated supply of fuel to said fuel burners.

NILS ERLAND AF KLEEN.